United States Patent
You et al.

(10) Patent No.: US 9,380,360 B2
(45) Date of Patent: Jun. 28, 2016

(54) WAVELENGTH SELECTIVE SWITCH AND WAVELENGTH SELECTION METHOD

(71) Applicant: WUHAN RESEARCH INSTITUTE OF POSTS AND TELECOMMUNICATIONS, Wuhan (CN)

(72) Inventors: Quan You, Wuhan (CN); Dequan Xie, Wuhan (CN); Zichen Liu, Wuhan (CN); Ying Qiu, Wuhan (CN); Miaofeng Li, Wuhan (CN); Qi Yang, Wuhan (CN)

(73) Assignee: WUHAN RESEARCH INSTITUTE OF POSTS AND TELECOMMUNICATIONS, Wuhan (CN)

( * ) Notice: Subject to any disclaimer, the term of this patent is extended or adjusted under 35 U.S.C. 154(b) by 0 days.

(21) Appl. No.: 14/334,580

(22) Filed: Jul. 17, 2014

(65) Prior Publication Data

US 2015/0139642 A1 May 21, 2015

(30) Foreign Application Priority Data

Nov. 19, 2013 (CN) .......................... 2013 1 0585336

(51) Int. Cl.
*H04Q 11/00* (2006.01)
*H04J 14/02* (2006.01)
(Continued)

(52) U.S. Cl.
CPC ............ *H04Q 11/0005* (2013.01); *G02B 6/356* (2013.01); *G02B 6/3512* (2013.01); *G02B 6/3556* (2013.01); *H04Q 2011/0026* (2013.01);
(Continued)

(58) Field of Classification Search
CPC .............. H04Q 2011/0035; H04Q 2011/0041
USPC ................................. 398/48, 45, 43
See application file for complete search history.

(56) References Cited

U.S. PATENT DOCUMENTS

| | | | |
|---|---|---|---|
| 2002/0135857 A1* | 9/2002 | Fitzpatrick | B41J 2/465 359/291 |
| 2006/0198583 A1 | 9/2006 | Oikawa et al. | |

(Continued)

FOREIGN PATENT DOCUMENTS

| | | |
|---|---|---|
| CN | 1831574 A | 9/2006 |
| CN | 102226848 A | 10/2011 |

OTHER PUBLICATIONS

Chinese Patent Application No. 201310585336.4, Chinese Patent Office, First Office Action mailed on Jan. 28, 2015; 6 pages.

(Continued)

*Primary Examiner* — Oommen Jacob
(74) *Attorney, Agent, or Firm* — Peter Su; Dentons US LLP

(57) ABSTRACT

A wavelength selective switch and a wavelength selection method are provided. The wavelength selective switch comprises a plurality of input ports, via which a plurality of light beams are input respectively, each light beam including at least one optical signal of a predetermined wavelength; at least one output port; and a wavelength separation apparatus including a wavelength separation device and a micro-mirror group, the wavelength separation device being configured to separate at least one optical signal from a light beam input via a predetermined one of the plurality of input ports, and the micro-mirror group being configured to adjust a propagation direction of the at least one optical signal, so that the at least one optical signal is output via a predetermined one of the at least one output port.

10 Claims, 4 Drawing Sheets

(51) Int. Cl.
*H04J 14/06* (2006.01)
*G02B 6/35* (2006.01)

(52) U.S. Cl.
CPC .............. *H04Q 2011/0035* (2013.01); *H04Q 2011/0037* (2013.01)

(56) References Cited

U.S. PATENT DOCUMENTS

| | | | | |
|---|---|---|---|---|
| 2009/0028503 | A1* | 1/2009 | Garrett | G02B 6/29311 385/18 |
| 2012/0236216 | A1* | 9/2012 | Sharma | G02B 26/02 349/1 |
| 2012/0237218 | A1* | 9/2012 | Yang | G02B 6/356 398/48 |
| 2013/0088568 | A1* | 4/2013 | Nolte | A61B 5/0075 348/40 |
| 2013/0177272 | A1* | 7/2013 | Stewart | G02B 6/354 385/11 |
| 2014/0186038 | A1* | 7/2014 | Frisken | G02B 6/356 398/50 |
| 2014/0285867 | A1* | 9/2014 | Wagener | G02F 1/31 359/279 |
| 2015/0023662 | A1* | 1/2015 | Suzuki | H04J 14/02 398/48 |
| 2015/0139642 | A1* | 5/2015 | You | H04Q 11/0005 398/48 |
| 2015/0188656 | A1* | 7/2015 | Sakurai | H04J 14/0212 398/49 |
| 2015/0208143 | A1* | 7/2015 | Frisken | G02B 6/3512 398/48 |

OTHER PUBLICATIONS

English Text of Chinese Patent Application No. 201310585336.4, Chinese Patent Office, First Office Action mailed on Jan. 28, 2015; 8 pages.
Chinese Patent Application No. 201310585336.4, Chinese Patent Office, Second Office Action mailed Aug. 10, 2015; 4 pages.
English Text of Second Office Action for Chinese Patent Application No. 201310585336.4, Chinese Patent Office, Second Office Action mailed Aug. 10, 2015; 5 pages.

* cited by examiner

Stereogram

Side view    Top view

Developed front view

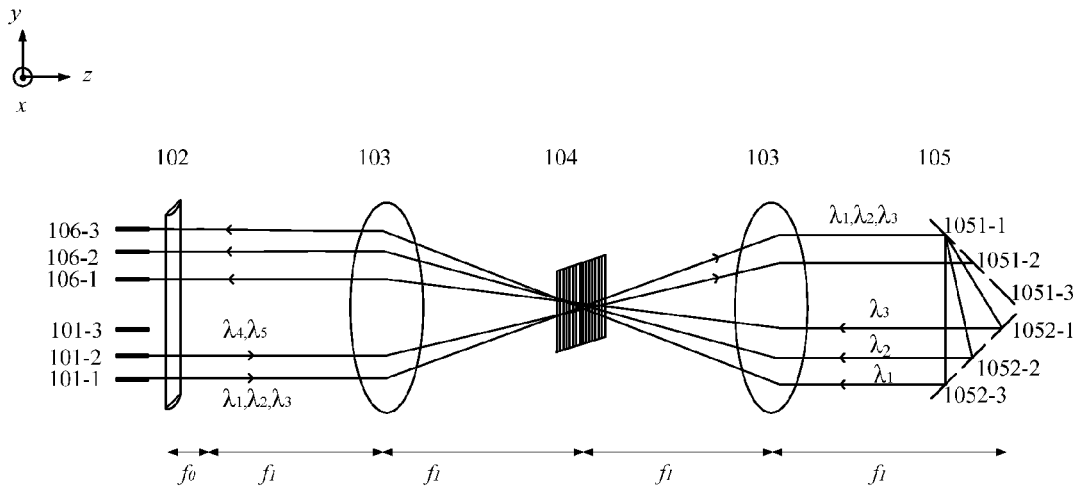

A plurality of light beams input via the plurality of input ports are received, and each light beam includes at least one optical signal of a predetermined wavelength

S502

The wavelength separation device is used to separate at least one optical signal from a light beam input via a predetermined input port of the plurality of input ports.

S503

A micro-mirror group is used to adjust a propagation direction of the at least one optical signal, so that the at least one optical signal is output via a predetermined output port of the at least one output port.

Fig.5

WAVELENGTH SELECTIVE SWITCH AND WAVELENGTH SELECTION METHOD

CROSS REFERENCE TO RELATED APPLICATIONS

This application is based upon and claims the benefit of priority under 35 U.S.C. §119(a) from the prior Chinese Patent Application 201310585336.4, filed in the State Intellectual Property Office of the P.R.C. on Nov. 19, 2013, the disclosure of which is hereby incorporated by reference in its entirety.

TECHNICAL FIELD

The present disclosure relates to an intelligent optical network, and, more particularly, to a wavelength selective switch (WSS) applicable in the intelligent optical network, and a corresponding wavelength selection method.

BACKGROUND

An intelligent optical network (for example, optical communication network) mainly consists of a series of equipment with high flexibility, where a Reconfigurable Optical Add/Drop Multiplexer (ROADM) is a core functional module in the intelligent optical network. A conventional ROADM adopts a 1×M WSS (M>1), and achieves connection among network nodes by software configuration and automatic power balancing to achieve adding, dropping and direct connection of a wavelength. However, because the conventional ROADM based on the 1×M WSS has a limited number of ports, the number of ROADMs in the optical network increases sharply with development of the intelligent optical network into a higher dimension, network management becomes more complicated, and power consumption cost increases accordingly. Therefore, increasing the number of input ports and output ports of a single ROADM becomes one of the key issues to be solved for a next generation of ROADM technology. To this end, an N×M WSS (N>1, M≥1) which can be used in the ROADM is proposed. However, a conventional N×M WSS cannot implement that optical signals of different wavelengths input from different input ports are output from a same output port.

Therefore, a new wavelength selective switch and wavelength selection method are needed, which not only can implement that an optical signal of any wavelength input via any input port is output via any output port, but also can implement that optical signals of different wavelengths input via different input ports are output via a same output port.

SUMMARY

The present disclosure is proposed in view of the above problem. An object of the present disclosure is to provide a wavelength selective switch and a wavelength selection method, which not only can implement that an optical signal of any wavelength input via any input port is output via any output port, but also can implement that optical signals of different wavelengths input via different input ports are output via a same output port.

According to an aspect of the present disclosure, there is provided a wavelength selective switch, comprising a plurality of input ports via which a plurality of light beams are input respectively, each light beam including at least one optical signal of a predetermined wavelength; at least one output port; and a wavelength separation apparatus, which includes a wavelength separation device and a micro-mirror group, the wavelength separation device being configured to separate at least one optical signal from a light beam input via a predetermined one of the plurality of input ports, and the micro-mirror group being configured to adjust a propagation direction of the at least one optical signal, so that the at least one optical signal is output via a predetermined one of the at least one output port.

According to another aspect of the present disclosure, there is provided a wavelength selection method executed by a wavelength selective switch which includes a plurality of input ports, a wavelength separation apparatus including a wavelength separation device and a micro-mirror group, and at least one output port, the wavelength selection method comprising receiving a plurality of light beams input via the plurality of input ports respectively, each light beam including at least one optical signal of a predetermined wavelength; separating at least one optical signal from the light beam input via a predetermined one of the plurality of input ports by using the wavelength separation device; and adjusting a propagation direction of the at least one optical signal by using the micro-mirror group, so that the at least one optical signal is output via a predetermined one of the at least one output port.

In the wavelength selective switch and the wavelength selection method according to the above aspects of the present disclosure, the wavelength separation device is used to separate at least one optical signal from the light beams input via the respective input ports, and then the micro-mirror array is used to adjust the propagation direction of the optical signal. In this way, by adjusting the micro-mirror array, it can be implemented that an optical signal of any wavelength input via any input port is output from any output port, and that optical signals of different wavelengths input via different input ports are output from a same output port. In addition, in the wavelength selective switch and the wavelength selection method according to the above aspects of the present disclosure, an optical path is concise and a switching method is simple, thus they can be widely applied to various optical networks, such as optical communication networks, optical sensing networks, etc.

BRIEF DESCRIPTION OF THE DRAWINGS

The above and other objects, features and advantages of the present disclosure will become clearer by describing embodiments thereof in detail in conjunction with drawings where:

FIG. 4 schematically shows an equivalent optical path diagram of the wavelength selective switch as shown in FIG. 2A.

FIG. 5 is a flow chart of a wavelength selection method according to an embodiment of the present disclosure.

DETAILED DESCRIPTION

A wavelength selective switch and a wavelength selection method according to embodiments of the present disclosure will be described below in conjunction with the accompanying drawings. Like reference numbers denote like components throughout the drawings.

First, the wavelength selective switch according to the embodiment of the present disclosure is described with reference to FIG. 1

Figure 1:
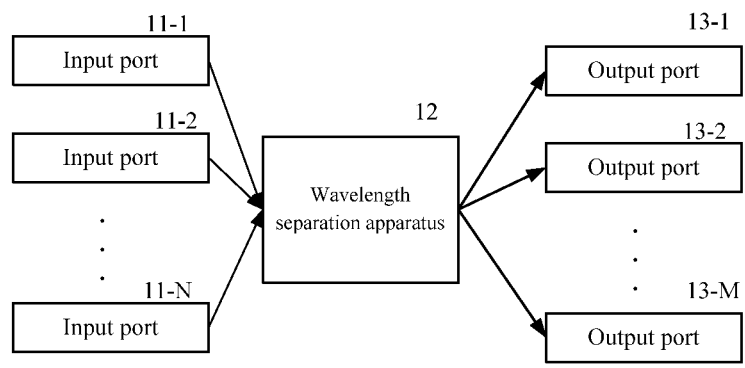
FIG. 1 is a schematic structural block diagram of a wavelength selective switch according to an embodiment of the present disclosure.

As shown in FIG. 1, the wavelength selective switch 10 includes N input ports 11-1, 11-2, ..., 11-N (which may be collectively referred to as 11 hereinafter), a wavelength separation apparatus 12, and M output ports 13-1, 13-2, ..., 13-M (which may be collectively referred to as 13 hereinafter), where N is an integer greater than 1, and M is an integer greater than or equal to 1.

A plurality of light beams can be input to the wavelength selective switch 10 via the N input ports 11 respectively. Each light beam may include one optical signal or may include a plurality of optical signals of different wavelengths, and wavelengths of optical signals included in the light beams input via different input ports may be the same or different. The optical signal described herein may be light carrying information or single-wavelength light not carrying information. In a case where each light beam includes a plurality of optical signals, the light beam may be one formed by multiplexing the plurality of optical signals together through a Wavelength Division Multiplexing (WDM) technology, a Coarse Wavelength Division Multiplexing (CWDM) technology, or a Dense Wavelength Division Multiplexing (DWDM) technology, etc. The wavelengths of the respective optical signals may be wavelengths prescribed by International Telecommunications Union (ITU). Specifically, the wavelengths of the respective optical signals may be wavelengths frequently used in WDM, CWDM or DWDM optical communication systems, such as wavelengths within a range of 1530~1565 nanometers, or other wavelengths.

The wavelength separation apparatus 12 includes a wavelength separation device and a micro-mirror group (not shown). The wavelength separation device can separate at least one optical signal from the light beam input via a predetermined one of the N input ports 11, and the micro-mirror group can adjust a propagation direction of the at least one optical signal which is separated, so that the at least one optical signal is output via a predetermined one of the M output ports 13. The predetermined input port may be any one of the N input ports, or a certain input port selected according to needs, and the predetermined output port may be any one of the M output ports, or a certain output port selected according to needs.

The wavelength selective switch as shown in FIG. 1 can be implemented in many ways, and an exemplary implementation of the wavelength selective switch is described below. In the exemplary implementation, it is assumed for convenience of description and illustration that N is 3 and M is 3, i.e. the wavelength selective switch has 3 input ports and 3 output ports. However, it is to be appreciated that N and M may be values selected according to actual needs.

Figure 2A:
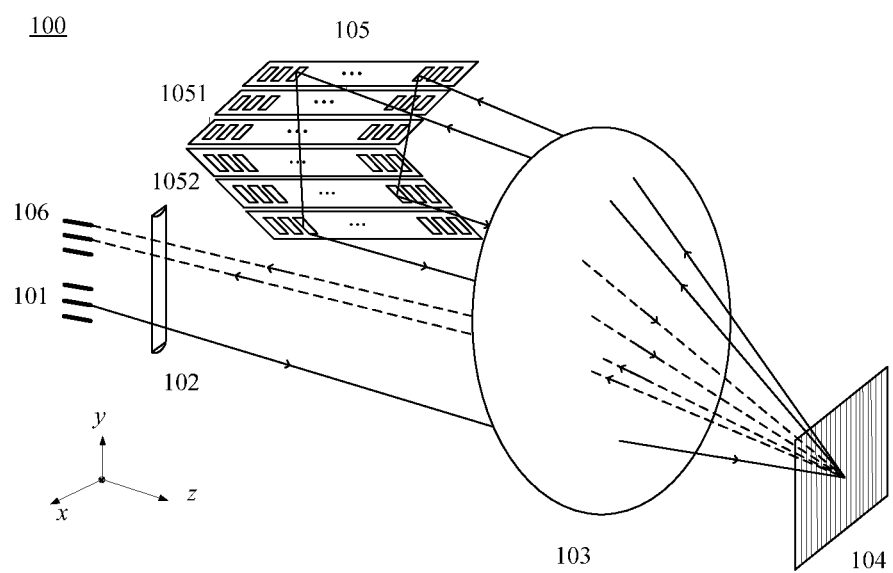
FIG. 2A is a diagram schematically showing an exemplary implementation of the wavelength selective switch according to the embodiment of the present disclosure.

As shown in FIG. 2A, the wavelength selective switch 100 includes an input collimator array 101, a cylindrical lens 102, a focusing lens 103, a diffraction grating 104, a micro-mirror group 105 and an output collimator array 106. The input collimator array 101 corresponds to the input ports 11 of the wavelength selective switch 10 described with reference to FIG. 1. The cylindrical lens 102, the focusing lens 103, the diffraction grating 104, and the micro-mirror group 105 correspond to the wavelength separation apparatus 12 described with reference to FIG. 1. The output collimator array 106 corresponds to the output ports 13 described with reference to FIG. 1.

The input collimator array 101 includes N (=3) input collimators, via each of which one light beam may be input. As described above, the light beam may include one optical signal or a plurality of optical signals of different wavelengths. The output collimator array 106 includes M (=3) output collimators, via each of which one light beam or optical signal may be output. The respective input collimators in the input collimator array 101 and the respective output collimators in the output collimator array 106 may be arranged in a certain direction in parallel at equal or unequal intervals. In an example as shown in FIG. 2A, the respective input collimators are arranged on one side, and the respective output collimators are arranged on the other side. In another embodiment, the respective input collimators and the respective output collimators may be arranged alternately.

Figure 2B:
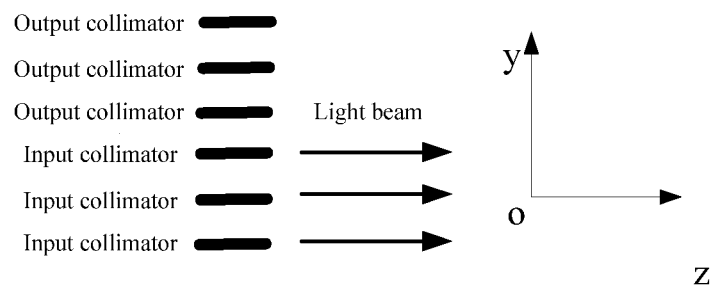
FIG. 2B is a diagram schematically showing y-axis and z-axis of a three-dimensional coordinate system established in FIG. 2A.

A three-dimensional coordinate system is established in FIG. 2A for convenience of description. Specifically, the direction in which the respective input collimators in the input collimator array 101 and the respective output collimators in the output collimator array 106 are arranged may be defined as a y-direction (i.e., the respective collimators are arranged in parallel in the y-direction), and a propagation direction of the (parallel) light beams emitted from the respective input collimators in the input collimator array 101, which is perpendicular to the y-direction, may be defined as a z-direction, as shown in FIGS. 2A and 2B. Accordingly, either of two directions that are perpendicular to a y-z plane formed by the y-axis and the z-axis can be defined as an x-direction. It is to be noted that, in the example shown in FIG. 2A, as described below, the light beam incident to the diffraction grating 104 (specifically, the respective optical signals included in the light beam) is (are) diffracted at the diffraction grating 104, so that the propagation direction of the light beam (specifically, the respective optical signals) is changed. In such a case, in an optical path from the diffraction grating 104 to the micro-mirror group 105, the propagation direction of the light beam or a certain optical signal can be defined as the z-direction, and the above coordinate system is rotated correspondingly. It is to be noted that the coordinate system is established merely to describe the embodiments of the present disclosure, and does not affect an actual arrangement of the respective components, therefore the rotation of the coordinate system with the propagation direction of the light beam or the optical signal will not affect implementation of the embodiments of the present disclosure.

The cylindrical lens 102 is a cylindrical lens in the x-direction. That is, for a light beam passing through the cylindrical lens 102 in the z-direction, a cross section of the cylindrical lens 102 in a y-z plane is a planar cylinder, while a cross section of the cylindrical lens 102 in an x-z plane is a convex lens of which an optical axis extends in the z-direction. Therefore, in this implementation, when the light beam passes through the cylindrical lens 102, the light beam remains unchanged in the y-direction.

Figure 2C:
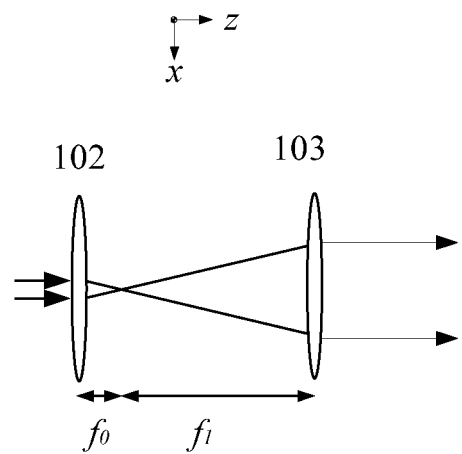
FIG. 2C is a diagram schematically showing a beam expander device formed by a cylindrical lens 102 and a focusing lens 103 as shown in FIG. 2A.

The focusing lens 103 may be a lenticular lens, and an optical axis thereof extends in the z-direction. The focusing lens 103 and the cylindrical lens 102 form a beam expander device in the x-direction. Specifically, as shown in FIG. 2C, assuming that a focal length of the cylindrical lens 102 is $f_0$ (in the x-z plane), and a focal length of the focusing lens 103 is $f_1$, the focusing lens 103 and the cylindrical lens 102 may be arranged so that a distance between them is $f_0+f_1$. In this way, when the light beam passes through the cylindrical lens 102 and the focusing lens 103 in the z-direction, each optical signal in the light beam is beam-expanded in the x-direction.

The diffraction grating 104 is a reflective diffraction grating. The diffraction grating 104 is arranged so that, when the light beam is incident onto the diffraction grating 104, the light beam will be diffracted in the x-z plane, and will be mirror-reflected in the y-direction. A reflective diffraction grating commonly known in the art can be used as the diffraction grating 104.

Specifically, according to a diffraction principle, diffraction of an optical signal of a wavelength $\lambda$ (included in a light beam) which is incident onto the diffraction grating 104 at an incident angle $\alpha_1$ in the x-z plane (or in the x-direction) satisfies:

$$n\lambda = d(\sin\alpha_1 + \sin\beta_1) \quad (1)$$

where n represents a diffraction order and d represents a grating constant of the diffraction grating 104. Since energy of the incident light mainly concentrates on a first-order diffracted light, it is feasible to consider the first-order diffracted light only, i.e., n=1. According to the above formula (1), it can be known that a diffraction angle $\beta_1$ depends on the incident angle $\alpha_1$ and the wavelength $\lambda$ of the optical signal. For two or more optical signals in a light beam input via a same input port, they can be separated from each other in the x-direction by the diffraction, because they have the same incident angle and different wavelengths. In other words, the diffraction grating 104 becomes the wavelength separation device, which can separate optical signals of different wavelengths in the light beam input via the same input port from each other in the x-direction. On the other hand, since two or more light beams input via different input ports are incident onto the diffraction grating 104 in different positions in the y-direction, these light beams will be diffracted in the x-z plane in different positions in the y-direction of the diffraction grating 104, so that these light beams can be separated from each other.

The micro-mirror group 105 includes input-side micro-mirror arrays 1051 corresponding to the respective input ports, and output-side micro-mirror arrays 1052 corresponding to the respective output ports. In this example, since the wavelength selective switch 100 has N=3 input ports and M=3 output ports, the micro-mirror group 105 includes 3 input-side micro-mirror arrays 1051-1, 1051-2 and 1051-3 (which may be collectively referred to as 1051 hereinafter) corresponding to the 3 input ports respectively, and 3 output-side micro-mirror arrays 1052-1, 1052-2 and 1052-3 (which may be collectively referred to as 1052 hereinafter) corresponding to the 3 output ports respectively, as shown in FIG. 3.

A structure of the micro-mirror group 105 is described below in more detail with reference to FIG. 3. FIG. 3 shows a stereogram, a side view, a top view, and a developed front view of the micro-mirror group 105, where the developed front view is a front view obtained by developing a plane in which the input-side micro-mirror arrays 1051 are located and a plane in which the output-side micro-mirror arrays 1052 are located into one plane. As shown in FIG. 3, the respective input-side micro-mirror arrays 1051 and the respective output-side micro-mirror arrays 1052 can be arranged in parallel in the y-direction respectively. The respective input-side micro-mirror arrays 1051 can be arranged so that the light beams output via the respective input ports can be incident onto the input-side micro-mirror arrays 1051 corresponding to the input ports. In addition, the plane in which the input-side micro-mirror arrays 1051 are located and the plane in which the output-side micro-mirror arrays 1052 are located are arranged relatively at a certain angle (for example, 45°), so that an input-side micro-mirror array corresponding to a predetermined input port in the plurality of input-side micro-mirror arrays can reflect the light beam incident onto the array (specifically, the optical signals in the light beam) onto any output-side micro-mirror array in the plurality of output-side micro-mirror arrays (or an output-side micro-mirror array corresponding to a predetermined output port).

Figure 3:
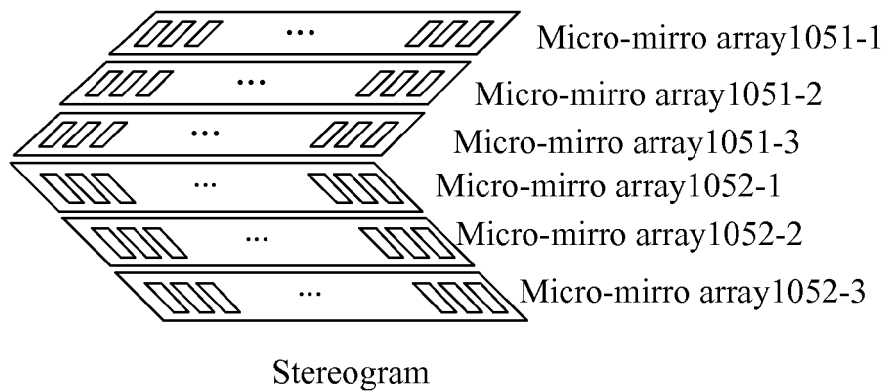
FIG. 3 are diagrams schematically showing a structure of a micro-mirror group as shown in FIG. 2A.
Figure 3:
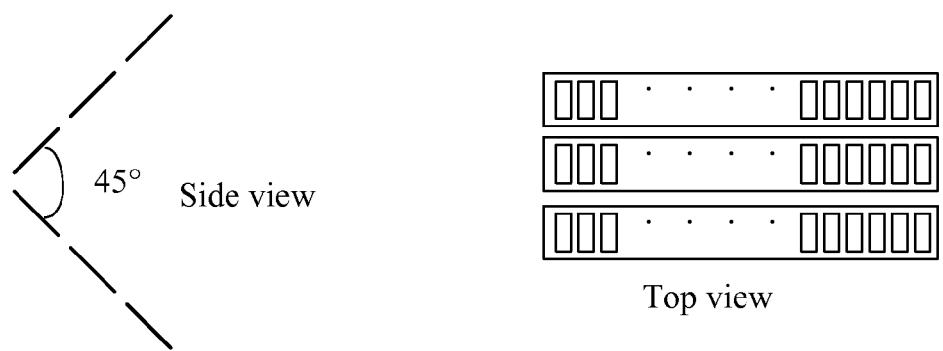
Figure 3:
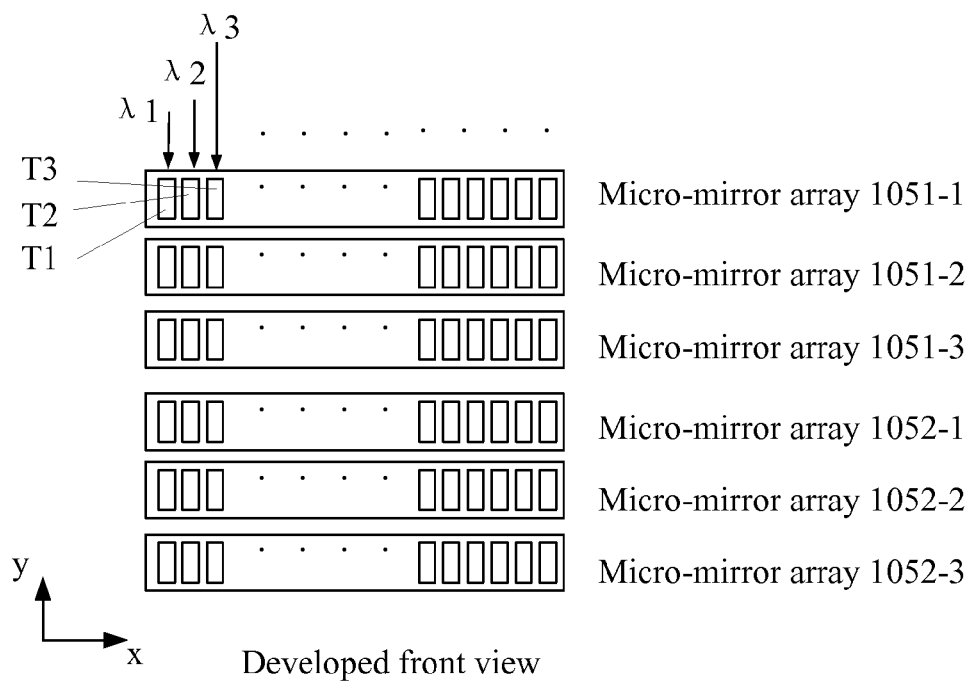

As shown in FIG. 3, the respective input-side micro-mirror arrays may have the same structure. Specifically, each input-side micro-mirror array may include a plurality of micro-mirrors, which may be arranged in the x-direction, and each micro-mirror corresponds to one wavelength. Since the optical signals of different wavelengths in the light beam input via the same input port are separated from each other in the x-direction after being diffracted by the diffraction grating 104, a plurality of micro-mirrors in the input-side micro-mirror array corresponding to the input port may be arranged so that the optical signals of different wavelengths diffracted from the diffraction grating 104 onto the input-side micro-mirror array can be incident onto different micro-mirrors corresponding to the wavelengths of the optical signals. As an example, an optical signal of a wavelength $\lambda_1$ may be incident onto a micro-mirror $T_1$ on the left side of each input-side micro-mirror array, an optical signal of a wavelength $\lambda_2$ may be incident onto a second micro-mirror $T_2$ on the left side of each input-side micro-mirror array, an optical signal of a wavelength $\lambda_3$ may be incident onto a third micro-mirror $T_3$ on the left side of each input-side micro-mirror array, and so on. Each micro-mirror in the input-side micro-mirror array can be controlled by using a Micro Electro Mechanical System (MEMS), i.e., an orientation of each micro-mirror can be changed by using the MEMS, so as to change a reflection direction of an optical signal incident onto the micro-mirror. Certainly, each micro-mirror can also be controlled by using other driving mechanisms (such as a piezoelectric actuator).

The output-side micro-mirror arrays may have the same structure as the input-side micro-mirror arrays. Specifically, each output-side micro-mirror array may include a plurality of micro-mirrors, which may be arranged in the x-direction, and each micro-mirror corresponds to one wavelength. In this way, an orientation of each micro-mirror in the input-side micro-mirror arrays may be changed, so that the light beam reflected from the micro-mirror can be incident onto a micro-mirror corresponding to the wavelength thereof in a predetermined or any output-side micro-mirror array according to the wavelength thereof. As an example, an optical signal of a wavelength $\lambda_1$ may be made incident onto a micro-mirror $T_1$ on the left side of the output-side micro-mirror array, an optical signal of a wavelength $\lambda_2$ may be made incident onto a second micro-mirror $T_2$ on the left side of the output-side micro-mirror array, an optical signal of a wavelength $\lambda_3$ may be made incident onto a third micro-mirror $T_3$ on the left side of the output-side micro-mirror array, and so on. Likewise, each micro-mirror in the output-side micro-mirror arrays may be controlled by the MEMS or other driving mechanism, to change the orientation of each micro-mirror to change a reflection direction of the optical signal incident onto the micro-mirror, so that the optical signal is finally output via a predetermined output port.

A process of performing the wavelength selection by the wavelength selective switch 100 is described below in detail with reference to FIG. 4. FIG. 4 shows an equivalent optical path diagram of the wavelength selective switch as shown in FIG. 2A. As an example, it is assumed that two light beams are respectively input via the input ports 101-1 and 101-2, where the light beam input via the input port 101-1 includes optical signals of three wavelengths (assumed to be $\lambda_1$, $\lambda_2$ and $\lambda_3$), and the light beam input via the input port 101-2 includes optical signals of two wavelengths (assumed to be $\lambda_4$ and $\lambda_5$), and it is assumed that, as an objective of the wavelength selection, it is desired to output the optical signal of wavelength $\lambda_1$ via the output port 106-3, to output the optical signal of wavelength $\lambda_2$ via the output port 106-2, and to output the optical signal of wavelength $\lambda_3$ via the output port 106-1. It is to be noted that, in a case where the diffraction grating 104 as shown in FIG. 2A is a reflective diffraction grating, although the light beam incident onto the diffraction grating 104 and the light beam emitted from the diffraction grating 104 are located on the same side of the diffraction grating 104, in FIG. 4 the light beam incident onto the diffraction grating 104 and the light beam emitted from the diffraction grating 104 are equivalently shown as being located on two sides of the diffraction grating 104 for convenience of description.

As mentioned above, it is assumed that the focal length of the cylindrical lens 102 is $f_0$ in the x-z plane and the focal length of the focusing lens 103 is $f_1$. The cylindrical lens 102, the focusing lens 103 and the diffraction grating 104 are arranged so that distances among them satisfy the relationship shown in FIG. 4, i.e., the distance between the cylindrical lens 102 and the focusing lens 103 is $f_0+f_1$, and the distance between the focusing lens 103 and the diffraction grating 104 is $f_1$. In addition, the micro-mirror group 105 is arranged so that its distance from the focusing lens 103 is substantially equal to $f_1$. The distance mentioned here indicates the distance on the optical path.

The two light beams input via the input port 101-1 and the input port 101-2 respectively are incident in parallel onto the cylindrical lens 102 in the z-direction. As mentioned above, the cylindrical lens 102 and the focusing lens 103 form a beam expander device in the x-z plane. Thus, a light spot (or cross-sectional area) of each light beam (specifically, each optical signal included in the light beam) incident onto the cylindrical lens 102 may be expanded in the x-direction, so that diffraction efficiency of the light beam (specifically, each optical signal included in the light beam) at the diffraction grating 104 is improved. In the y-z plane, the two light beams input via the input ports 101-1 and 101-2 are converged onto the diffraction grating 104.

After the diffraction at the diffraction grating 104, in the y-z plane, the light beam input via the input port 101-1 is incident onto the micro-mirror array 1051-1 corresponding to the input port, and the light beam input via the input port 101-2 is incident onto the micro-mirror array 1051-2 corresponding to the input port. In addition, as mentioned above, in the x-z plane, the optical signals of wavelengths $\lambda_1$, $\lambda_2$ and $\lambda_3$ included in the light beam input via the input port 101-1 are separated from one another, and are respectively incident onto three micro-mirrors in the micro-mirror array 1051-1 as shown in FIG. 3, and the two optical signals included in the light beam input via the input port 101-2 are incident onto micro-mirrors corresponding to the wavelengths thereof in the micro-mirror array 1051-2 as shown in FIG. 3 after diffraction.

According to the objective of the wavelength selection, orientations of the respective micro-mirrors onto which the optical signals of wavelengths $\lambda_1$, $\lambda_2$, and $\lambda_3$ included in the light beam input via the input port 101-1 are incident may be changed to control the output ports from which the respective optical signals are emitted. Specifically, since it is desired to make the optical signal of wavelength $\lambda_1$ be emitted from the output port 106-3, the orientation of the micro-mirror $T_1$ may be changed to reflect the optical signal of wavelength $\lambda_1$ onto a micro-mirror corresponding to the wavelength $\lambda_1$ in the output-side micro-mirror array 1052-3 corresponding to the output port 106-3. In order to make the optical signal of wavelength $\lambda_2$ be emitted from the output port 106-2, the orientation of the micro-mirror $T_2$ may be changed to reflect the optical signal of wavelength $\lambda_2$ onto a micro-mirror corresponding to the wavelength $\lambda_2$ in the output-side micro-mirror array 1052-2 corresponding to the output port 106-2. In order to make the optical signal of wavelength $\lambda_3$ be emitted from the output port 106-1, the orientation of the micro-mirror $T_3$ may be changed to reflect the optical signal of wavelength $\lambda_3$ onto a micro-mirror corresponding to the wavelength $\lambda_3$ in the output-side micro-mirror array 1052-1 corresponding to the output port 106-1.

The micro-mirror corresponding to the wavelength $\lambda_1$ in the output-side micro-mirror array 1052-3 reflects the optical signal of wavelength $\lambda_1$, and the orientation of the micro-mirror may be adjusted so that the optical signal of wavelength $\lambda_1$ reflected by the micro-mirror is emitted in parallel to the optical axis of the focusing lens 103. The micro-mirror corresponding to the wavelength $\lambda_2$ in the output-side micro-mirror array 1052-2 reflects the optical signal of wavelength $\lambda_2$, and the orientation of the micro-mirror may be adjusted so that the optical signal of wavelength $\lambda_2$ reflected by the micro-mirror is emitted in parallel to the optical axis of the focusing lens 103. The micro-mirror corresponding to the wavelength $\lambda_3$ in the output-side micro-mirror array 1052-1 reflects the optical signal of wavelength $\lambda_3$, and the orientation of the micro-mirror may be adjusted so that the optical signal of wavelength $\lambda_3$ reflected by the micro-mirror is emitted in parallel to the optical axis of the focusing lens 103.

According to an optical path symmetry principle, the optical signal of wavelength $\lambda_1$ output via the output-side micro-mirror array 1052-3 will pass through the focusing lens 103, be diffracted and reflected at the diffraction grating 104, pass through the focusing lens 103 again, then pass through the cylindrical lens 102, and be emitted from the output port 106-3 corresponding to the output-side micro-mirror array 1052-3. Similarly, the optical signal of wavelength $\lambda_2$ output via the output-side micro-mirror array 1052-2 will be emitted from the output port 106-2 corresponding to the output-side micro-mirror array 1052-2, and the optical signal of wavelength $\lambda_3$ output via the output-side micro-mirror array 1052-1 will be emitted from the output port 106-1 corresponding to the output-side micro-mirror array 1052-1. In this way, through the wavelength selective switch 100, the optical signals of three wavelengths included in the light beam input via the input port 101-1 can be separated from one another, and output via their respective output ports, thereby achieving the wavelength selection.

For the light beam input via the input port 101-2, the optical signal of wavelength $\lambda_4$ and the optical signal of wavelength $\lambda_5$ (not shown in FIG. 4) can be separated from the light beam by the wavelength selective switch 100 in a similar way, and the optical signals can be output from a predetermined output port. The predetermined output port may be any output port selected from the plurality of output ports. The predetermined output port may also be an output port, which is the same as that for a certain optical signal in the light beam input via the input port 101-1. For example, an orientation of a micro-mirror corresponding to the wavelength $\lambda_4$ in the input-side micro-mirror array 1051-2 corresponding to the input port 101-2 may be changed so that the optical signal of wavelength $\lambda_4$ is reflected by the micro-mirror onto a micro-mirror corresponding to the wavelength $\lambda_4$ in the output-side micro-mirror array 1052-3 corresponding to the output port 106-3, then an orientation of the micro-mirror corresponding to the wavelength $\lambda_4$ in the output-side micro-mirror array 1052-3 may be changed so that the optical signal of wavelength $\lambda_4$ is reflected by the micro-mirror to be output via the output port 106-3. In this way, the optical signals of different wavelengths from different input ports may be output via a same output port.

It is seen that the wavelength selective switch according to the embodiment of the present disclosure can cause an optical signal of any wavelength input via any input port to be output via any output port. In addition, since a micro-mirror array corresponding to each input port and a micro-mirror array corresponding to each output port are provided, and micro-mirrors which can be adjusted independently and correspond to different wavelengths are provided in each micro-mirror array, the wavelength selective switch according to the embodiment of the present disclosure can also cause optical signals of different wavelengths which are input via different input ports to be output via a same output port. Moreover, the aforesaid wavelength selective switch has a concise optical path and uses a simple switching method, and thus can be widely applied in various optical networks.

It is to be appreciated that the above-described wavelength selective switch is only exemplary, and those skilled in the art may make various changes thereto without departing from the scope of the present disclosure. For example, although in the above the diffraction grating 104 is used as a wavelength separation device to separate the optical signals of different wavelengths in the x-direction, this is not limitative, and other types of wavelength separation devices may also be used to achieve such separation. In a case where the diffraction grating is used as the wavelength separation device, a transmissive diffraction grating can replace the reflective diffraction grating described above, in which case the wavelength selective switch as shown in FIG. 2A may be slightly modified. Specifically, in a case where the reflective diffraction grating is used, a focusing lens 103 and a micro-mirror group 105 are arranged on a same side of the diffraction grating, causing the optical signal to pass through the focusing lens twice in succession. In a case where the transmissive diffraction grating is used, a focusing lens can be added on a side of the diffraction grating 104 opposite to the focusing lens 103, and the micro-mirror group 105 is arranged behind the focusing lens, so that the optical signal emitted from the diffraction grating 104 passes through the focusing lens and the micro-mirror group sequentially, thereby achieving the wavelength selection; in this case, FIG. 4 can be regarded as a structural diagram of the wavelength selective switch. In addition, although a three-dimensional coordinate system is established in a specific way in the above, it is to be appreciated that this is not limitative, and the three-dimensional coordinate system can also be established in other ways. For example, the three-dimensional coordinate system mentioned above can be rotated so that the respective coordinate axes are interchanged with one another. It is to be noted that, as commonly known in the art, the focal length of a convex lens may change for lights of different wavelengths, however, since such change is relatively slight (especially within a commonly used wavelength range for a WDM system), it can be neglected in the embodiment of the present disclosure.

A wavelength selection method according to an embodiment of the present disclosure is described below. FIG. 5 shows a flow chart of the wavelength selection method according to the embodiment of the present disclosure. The method may be executed by the wavelength selective switch as shown in FIG. 1 or FIG. 2. Since various details of the method have been mentioned when the wavelength selective switch according to the embodiment of the present disclosure is described, the method will only be briefly described herein.

As shown in FIG. 5, in step S501, a plurality of light beams input via the plurality of input ports are received, and each light beam includes at least one optical signal of a predetermined wavelength.

As mentioned above, wavelengths of optical signals included in the light beams input via different input ports may be the same or different. In a case where each light beam includes a plurality of optical signals, the light beam may be one formed by multiplexing the plurality of optical signals together using various WDM technologies. In addition, the wavelengths of the respective optical signals may be wavelengths stipulated by the International Telecommunications Union (ITU). The optical signal of the predetermined wavelength mentioned here actually can be an optical signal of any wavelength selected from any light beam according to needs.

Next, in step S502, a wavelength separation device is used to separate at least one optical signal from a light beam input via a predetermined one of the plurality of input ports.

As mentioned above, the wavelength separation device may be a diffraction grating, such as a reflective diffraction grating or a transmissive diffraction grating, and, in this case, the optical signal may be separated by diffraction in the manner described above with reference to FIG. 4. Moreover, before the diffraction, the beam expander device mentioned above may also be used to beam-expand the plurality of light beams respectively, so that the plurality of beam-expanded light beams are incident onto the diffraction grating, thereby improving diffraction efficiency. In addition, a focusing lens may be used to converge the at least one optical signal emitted from the wavelength separation device onto an input micro-mirror array corresponding to the predetermined input port.

Then, in step S503, a micro-mirror group is used to adjust a propagation direction of the at least one optical signal, so that the at least one optical signal is output via a predetermined one of the at least one output port.

As mentioned above, the micro-mirror group includes a plurality of input-side micro-mirror arrays corresponding to the plurality of input ports respectively, and at least one output-side micro-mirror array corresponding to the at least one output port, and the at least one optical signal can be reflected by the input-side micro-mirror array corresponding to the predetermined input port to the output-side micro-mirror array corresponding to the predetermined output port. Specifically, each input-side micro-mirror array may include a plurality of input-side micro-mirrors corresponding to a plurality of different wavelengths respectively, and an orientation of each input-side micro-mirror can be adjusted independently by, for example, MEMS. The at least one optical signal can be incident onto the input-side micro-mirror corresponding to the wavelength of the at least one optical signal in the input-side micro-mirror array corresponding to the predetermined input port. In addition, each output-side micro-mirror array may include a plurality of output-side micro-mirrors corresponding to a plurality of different wavelengths respectively, and an orientation of each output-side micro-mirror can be adjusted independently by, for example, MEMS. The orientation of the input-side micro-mirror corresponding to the wavelength of the at least one optical signal may be adjusted, so that the micro-mirror reflects the at least one optical signal onto an output-side micro-mirror corresponding to the wavelength of the at least one optical signal in the output-side micro-mirror array corresponding to the predetermined output port. Then an orientation of the output-side micro-mirror may be adjusted, so that the at least one optical signal is emitted from the predetermined output port.

In this way, by using the above wavelength selection method, at least one optical signal may be separated from a plurality of light beams input into the wavelength selective switch via the respective input ports, and the optical signal is output via a predetermined output port, which means it can be achieved that an optical signal from any input port can be emitted from any output port. In addition, as stated above, by using the method, optical signals of different wavelengths can be separated from light beams input via different input ports, and the optical signals of different wavelengths can be output via the same output port, so that a more flexible wavelength selection is achieved.

Hereinbefore, the wavelength selective switch and the wavelength selection method according to the embodiments of the present disclosure are described in the context of an optical communication network, but this is not limitative, and the wavelength selective switch and the wavelength selection method may also be applied to other types of optical networks, such as an optical sensing network, etc.

Although the exemplary embodiments of the present disclosure have been illustrated and described, those skilled in the art will understand that various modifications in form and details may be made to these exemplary embodiments without departing from the scope and spirit of the present disclosure as defined by the claims and the equivalent thereof.

What is claimed is:

1. A wavelength selective switch, comprising:
   a plurality of input ports, via which a plurality of light beams are input respectively, each light beam including at least one optical signal of a predetermined wavelength; at least one output port; and
   a wavelength separation apparatus including a wavelength separation device and a micro-mirror group, the wavelength separation device being, configured to separate at least one optical signal from a light beam input via a predetermined input port of the plurality of input ports, and the micro-mirror group being configured to adjust a propagation direction of the at least one optical signal so that the at least one optical signal is output via a predetermined output port of the at least one output port,
   wherein the wavelength separation apparatus further includes:
   a beam expanding device configured to beam-expand the plurality of light beams, so that the plurality of expanded light beams are incident onto the wavelength separation device, wherein the beam expanding device includes a cylindrical lens and a first focusing lens;
   wherein the wavelength separation apparatus further includes:
   a convergence device configured to converge the at least one optical signal emitted from the wavelength separation device onto the input micro-mirror array corresponding to the predetermined input port, wherein the convergence device includes a second focusing lens,
   wherein the focal length of the cylindrical lens is $f_0$ in the x-z plane and the focal length of the first focusing lens is $f_1$, and the focal length of the second focusing lens is $f_1$,
   the cylindrical lens, the first focusing lens, the wavelength separation apparatus, the second focusing lens, and the micro-mirror group are arranged in order so that distances among them satisfy relationship as follows: the distance between the cylindrical lens and the first focusing lens is $f_0+f_1$, the distance between any one of the first focusing lens and the second focusing lens and the wavelength separation apparatus is $f_1$, and the distance between the second focusing lens and the micro-mirror group is $f_1$,
   wherein the micro-mirror group includes a plurality of input-side micro-mirror arrays corresponding to the plurality of input ports respectively, and at least one output-side micro-mirror array corresponding to the at least one output port, and an input-side micro-mirror array corresponding to the predetermined input port is configured to directly reflect the at least one optical signal to an output-side micro-mirror array corresponding to the predetermined output port,
   wherein the plurality of input-side micro-mirror arrays reflect a plurality of optical signals of different wavelengths from different input ports to one output-side micro-mirror array corresponding to one predetermined output port.

2. The wavelength selective switch of claim 1, wherein each input-side micro-mirror array includes a plurality of input-side micro-mirrors corresponding to a plurality of different wavelengths, and the at least one optical signal is incident onto an input-side micro-mirror corresponding to a wavelength of the at least one optical signal in an input-side micro-mirror array corresponding to the predetermined input port.

3. The wavelength selective switch of claim 2, wherein each output-side micro-mirror array includes a plurality of output-side micro-mirrors corresponding to a plurality of different wavelengths respectively, and the input-side micro-mirror corresponding to the wavelength of the at least one optical signal reflects the at least one optical signal onto an output-side micro-mirror corresponding to the wavelength of the at least one optical signal in an output-side micro-mirror array corresponding to the predetermined output port.

4. The wavelength selective switch of claim 3, wherein the wavelength separation device is a diffraction grating.

5. The wavelength selective switch of claim 3, wherein each input-side micro-mirror or each output-side micro-mirror is controlled by using a Micro Electro Mechanical System (MEMS).

6. A wavelength selection method performed by a wavelength selective switch including a plurality of input ports, a wavelength separation apparatus and at least one output port, the wavelength separation apparatus including a wavelength separation device and a micro-mirror group, the wavelength selection method comprising:
   receiving a plurality of light beams input via the plurality of input ports, each light beam including at least one optical signal of a predetermined wavelength;
   separating at least one optical signal from a light beams input via a predetermined input port of the plurality of input ports by using the wavelength separation device; and
   adjusting a propagation direction of the at least one optical signal by using the micro-mirror group, so that the at least one optical signal is output Via a predetermined output port of the at least one output port,
   wherein the wavelength separation apparatus further includes:
   a beam expanding device configured to beam-expand the plurality of light beams, so that the plurality of expanded light beams are incident onto the wavelength separation device, wherein the beam expanding device includes a cylindrical lens and a first focusing lens;
   wherein the wavelength separation apparatus further includes:
   a convergence device configured to converge the at least one optical signal emitted from the wavelength separation device onto the input micro-mirror array corresponding to the predetermined input port, wherein the convergence device includes a second focusing lens, wherein the focal length of the cylindrical lens is $f_0$ in the x-z plane and the focal length of the first focusing lens is $f_1$, and the focal length of the second focusing lens is $f_1$, the cylindrical lens, the first focusing lens, the wavelength separation apparatus, the second focusing lens, and the micro-mirror group are arranged in order so that distances among them satisfy relationship as follows: the distance between the cylindrical lens and the first focusing lens is $f_0+f_1$, the distance between any one of the first focusing lens and the second focusing lens and the wavelength separation apparatus is $f_1$, and the distance between the second focusing lens and the micro-mirror group is $f_1$, wherein the micro-mirror group includes a plurality of input-side micro-mirror arrays corresponding to the plurality of input ports respectively, and at least one output-side micro-mirror array corresponding to the at least one output port, and at least one optical signal is directly reflected to an output side micro-mirror array corresponding to the predetermined output port by an input side micro-mirror array corresponding to the predetermined input port, wherein the plurality of input-side micro-mirror arrays reflect a plurality of optical signals of different wavelengths from different input ports to one output-side micro-mirror array corresponding to one predetermined output port.

7. The wavelength selection method of claim 6, wherein each input-side micro-mirror array includes a plurality of input-side micro-mirrors corresponding to a plurality of different wavelengths respectively, and the at least one optical signal is incident onto an input-side micro-mirror corresponding to a wavelength of the at least one optical signal in an input-side micro-mirror array corresponding to the predetermined input port.

8. The wavelength selection method of claim 7, wherein each output-side micro-mirror array includes a plurality of output-side micro-mirrors corresponding to a plurality of different wavelengths respectively, and the input-side micro-mirror corresponding to the wavelength of the at least one optical signal reflects the at least one optical signal onto an output-side micro-mirror corresponding to the wavelength of the at least one optical signal in an output-side micro-mirror array corresponding to the predetermined output port.

9. The wavelength selection method of claim 8, wherein the wavelength separation device is a diffraction grating.

10. The wavelength selection method of claim 8, wherein each input-side micro-mirror or each output-side micro-mirror is controlled by using a Micro Electro Mechanical System (MEMS).

* * * * *